(12) United States Patent  
Li et al.

(10) Patent No.: US 9,979,908 B2
(45) Date of Patent: May 22, 2018

(54) IMAGE PROCESSING DEVICES AND IMAGE PROCESSING METHODS WITH INTERPOLATION FOR IMPROVING IMAGE RESOLUTION

(71) Applicant: Agency for Science, Technology and Research, Singapore (SG)

(72) Inventors: Zhengguo Li, Singapore (SG); Jinghong Zheng, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days. days.

(21) Appl. No.: 15/301,011

(22) PCT Filed: Mar. 31, 2015

(86) PCT No.: PCT/SG2015/000106
§ 371 (c)(1),
(2) Date: Sep. 30, 2016

(87) PCT Pub. No.: WO2015/152822
PCT Pub. Date: Oct. 8, 2015

(65) Prior Publication Data
US 2017/0026593 A1  Jan. 26, 2017

(30) Foreign Application Priority Data

Mar. 31, 2014  (SG) .............................. 10201401118V (51) Int. Cl.
*H04N 5/235* (2006.01)
*H04N 5/355* (2011.01)
(Continued)

(52) U.S. Cl.
CPC ....... *H04N 5/35563* (2013.01); *G06T 3/4015* (2013.01); *G06T 5/009* (2013.01);
(Continued)

(58) Field of Classification Search
CPC .................................................. H04N 5/35563
(Continued)

(56) References Cited

U.S. PATENT DOCUMENTS 6,906,748 B1 * 6/2005 Kawase ............. H04N 1/40068
348/246
2008/0143841 A1 * 6/2008 Tico .................... H04N 5/23248
348/208.99
(Continued)

FOREIGN PATENT DOCUMENTS

WO  WO2008075159  6/2008

OTHER PUBLICATIONS

Written Opinion dated Jul. 26, 2017 from Singapore Patent Application No. 11201608230P.

*Primary Examiner* — Usman Khan
(74) *Attorney, Agent, or Firm* — K. David Crookett, Esq.; Paul J. Backofen, Esq.; Crockett & Crockett, PC (57) ABSTRACT

According to various embodiments, an image processing device may be provided. The image processing device may include: an input circuit configured to receive input image data including pixels related to varying exposure times; an interpolation circuit configured to determine an output image based on an interpolation based on the input image data; and an output circuit configured to output the output image.

20 Claims, 5 Drawing Sheets

(51) Int. Cl.
*G06T 5/50* (2006.01)
*G06T 3/40* (2006.01)
*H04N 9/04* (2006.01)
*G06T 5/00* (2006.01)

(52) U.S. Cl.
CPC ........... *G06T 5/50* (2013.01); *H04N 5/35554* (2013.01); *H04N 9/045* (2013.01); *G06T 2200/21* (2013.01); *G06T 2207/10144* (2013.01); *G06T 2207/20208* (2013.01)

(58) Field of Classification Search
USPC ........................................................ 348/362
See application file for complete search history.

(56) References Cited

U.S. PATENT DOCUMENTS

| | | | | |
|---|---|---|---|---|
| 2010/0165139 A1* | 7/2010 | Muijs | ................... | H04N 1/6058 348/222.1 |
| 2012/0147963 A1* | 6/2012 | Sato | ..................... | H04N 19/176 375/240.16 |
| 2012/0281111 A1* | 11/2012 | Jo | ......................... | H04N 5/217 348/229.1 |

* cited by examiner

| R | G | R | G | R | G | R | G | R | G | R | G | A short exposure time |
| G | B | G | B | G | B | G | B | G | B | G | B | A medium exposure time |
| R | G | R | G | R | G | R | G | R | G | R | G | A long exposure time |
| G | B | G | B | G | B | G | B | G | B | G | B | A short exposure time |
| R | G | R | G | R | G | R | G | R | G | R | G | A medium exposure time |
| G | B | G | B | G | B | G | B | G | B | G | B | A long exposure time |
| R | G | R | G | R | G | R | G | R | G | R | G | A short exposure time |
| G | B | G | B | G | B | G | B | G | B | G | B | A medium exposure time |
| R | G | R | G | R | G | R | G | R | G | R | G | A long exposure time |
| G | B | G | B | G | B | G | B | G | B | G | B | A short exposure time |
| R | G | R | G | R | G | R | G | R | G | R | G | A medium exposure time |
| G | B | G | B | G | B | G | B | G | B | G | B | A long exposure time |

| R | G | R | G | R | G | R | G | R | G | R | G | A short exposure time |
| G | B | G | B | G | B | G | B | G | B | G | B | A long exposure time |

| R | G | R | G | R | G | R | G | R | G | R | G | A medium exposure time |
| G | B | G | B | G | B | G | B | G | B | G | B | A short exposure time |

| R | G | R | G | R | G | R | G | R | G | R | G | A long exposure time |
| G | B | G | B | G | B | G | B | G | B | G | B | A medium exposure time |

IMAGE PROCESSING DEVICES AND IMAGE PROCESSING METHODS WITH INTERPOLATION FOR IMPROVING IMAGE RESOLUTION

CROSS-REFERENCE TO RELATED APPLICATIONS

The present application claims the benefit of the Singapore patent application No. 10201401118V filed on 31 Mar. 2014, the entire contents of which are incorporated herein by reference for all purposes.

TECHNICAL FIELD

Embodiments relate generally to image processing devices and image processing methods.

BACKGROUND

One of the challenges in digital image processing research is the rendering of a high dynamic range (HDR) natural scene on a conventional low dynamic range (LDR) display. Thus, there may be a need for efficient devices and methods for providing HDR scenes.

SUMMARY

According to various embodiments, an image processing device may be provided. The image processing device may include: an input circuit configured to receive input image data including pixels related to varying exposure times; an interpolation circuit configured to determine an output image based on an interpolation based on the input image data; and an output circuit configured to output the output image.

According to various embodiments, an image processing method may be provided. The image processing method may include: receiving input image data including pixels related to varying exposure times; determining an output image based on an interpolation based on the input image data; and outputting the output image.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Embodiments described below in context of the devices are analogously valid for the respective methods, and vice versa. Furthermore, it will be understood that the embodiments described below may be combined, for example, a part of one embodiment may be combined with a part of another embodiment.

In this context, the image processing device as described in this description may include a memory which is for example used in the processing carried out in the image processing device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be, described in more detail below may also be understood as a "circuit" in accordance with an alternative embodiment.

One of the challenges in digital image processing research is the rendering of a high dynamic range (HDR) natural scene on a conventional low dynamic range (LDR) display. This challenge may be addressed by capturing multiple LDR images at different exposure levels or one single image with spatial varying exposures. Camera movements and moving objects may be two issues for the former while reduction of spatial resolution is an issue for the latter. The latter may be more attractive because registration of differently exposed images is much more a challenge than upsampling of differently exposed images. A cubic interpolation method may be adopted to increase the resolution of differently exposed images. However, the correlation among differently exposed images may not be well utilized and the quality of upsampled images may be desired to be improved.

According to various embodiments, a cross image cubic interpolation method may be provided for differently exposed images. The temporal correlation among all the input images may be utilized to determine two coefficients of the cubic interpolation method. Intermediate pixels may be constructed for those positions to be interpolated by using the temporal correlation among the differently exposed images. The intermediate pixels may serve as guided pixels for the cubic interpolation. Both the spatial correlation in the interpolated image and the temporal correlation among all the input images may be utilized in the invented algorithm. The temporal correlation may dominate the interpolation if it is reliable. Otherwise, the spatial correlation may dominate the interpolation. Experimental results show that the devices and methods according to various embodiments significantly outperform the commonly used cubic interpolation method and the PSNR (Peak signal-to-noise ratio) may be improved by up to 22.76 dB.

According to various embodiments, efficient devices and methods may be provided for providing HDR scenes.

Rolling shutter may be an efficient way to capture differently exposed images for HDR scenes. Camera movement and moving objects among the differently exposed images may be avoided by using such a captured method while the resolution of captured images is reduced. According to various embodiments, a cross image cubic interpolation for differently exposed images may be provided. Both the spatial correlation within an interpolated image and the temporal correlation among the differently exposed images may be utilized to determine two coefficients of the cubic interpolation. As such, quality of upsampled images may be significantly improved and the PSNR value of the upsampled image can be improved by up to 22.76 dB.

Figure 1A:
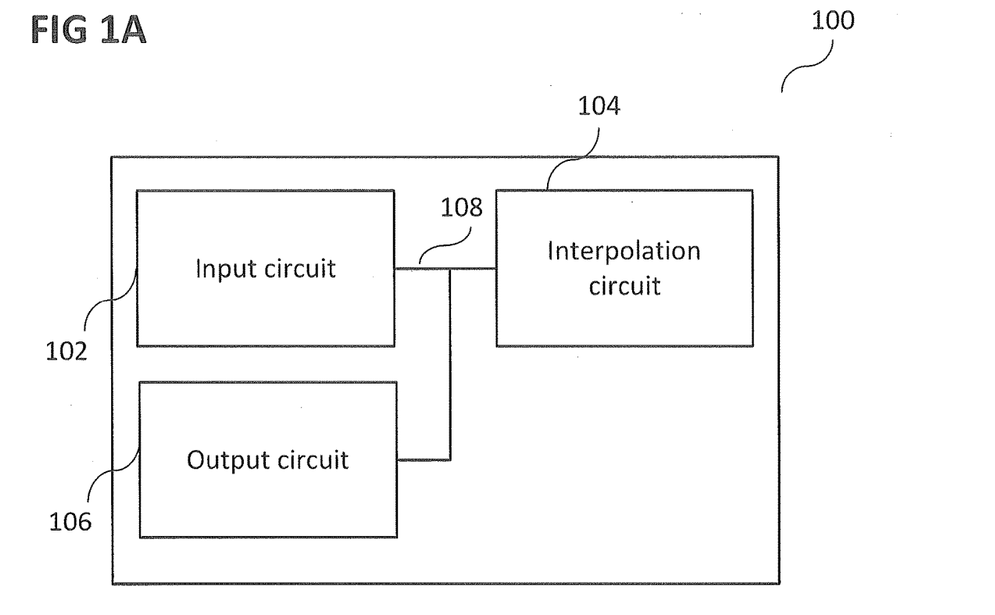
FIG. 1A shows an image processing device according to various embodiments.

FIG. 1A shows an image processing device 100 according to various embodiments. The image processing device 100 may include an input circuit 102 configured to receive input image data including pixels related to varying exposure times. The image processing device 100 may further include an interpolation circuit 104 configured to determine an output image based on an interpolation based on the input image data. The image processing device 100 may further include an output circuit 106 configured to output the output image. The input circuit 102, the interpolation circuit 104, and the output circuit 106 may be coupled with each other, like indicated by lines 108, for example electrically coupled, for example using a line or a cable, and/or mechanically coupled.

In other words, according to various embodiments, an interpolation which provides a spatial correlation and a temporal correlation of differently exposed image data may be provided.

According to various embodiments, the interpolation may include or may be a spatial and temporal interpolation of the input image data.

Figure 1B:
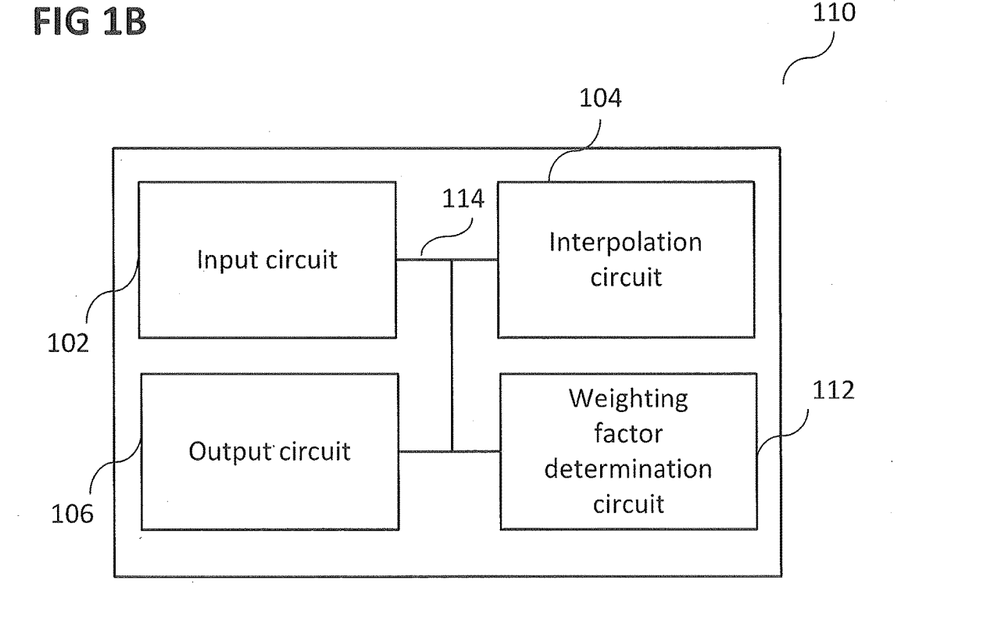
FIG. 1B shows an image processing device according to various embodiments.

FIG. 1B shows an image processing device 110 according to various embodiments. The image processing device 110 may, similar to the image processing device 100 of FIG. 1A, include an input circuit 102 configured to receive input image data including pixels related to varying exposure times. The image processing device 110 may, similar to the image processing device 100 of FIG. 1A, further include an interpolation circuit 104 configured to determine an output image based on an interpolation based on the input image data. The image processing device 110 may, similar to the image processing device 100 of FIG. 1A, further include an output circuit 106 configured to output the output image. The image processing device 110 may further include a weighting factor determination circuit 112, like will be described in more detail below. The input circuit 102, the interpolation circuit 104, the output circuit 106, and the weighting factor determination circuit 112 may be coupled with each other, like indicated by lines 114, for example electrically coupled, for example using a line or a cable, and/or mechanically coupled.

According to various embodiments, the weighting factor determination circuit 112 may be configured to determine a weighting factor (for example w(p), like will be described in more detail below). According to various embodiments, the interpolation circuit 104 may further be configured to determine the output image further based on the weighting factor.

According to various embodiments, the weighting factor determination circuit 112 may be configured to determine the weighting factor based on an intermediate pixel (for example $\hat{Z}_{1,2}(p)$, like will be described in more detail below).

According to various embodiments, the intermediate pixel may be based on an intensity mapping function (for example $\Lambda_{1,2}(z)$ and $\Lambda_{3,2}(z)$, like will be described in more detail below).

According to various embodiments, the weighting factor may be close to one if the intensity mapping function is reliable.

According to various embodiments, the weighting factor may be close to zero if the intensity mapping function is not reliable.

According to various embodiments, the input image data may include an input image including rows, wherein the exposure time varies amongst the rows (for example like shown and described with reference to FIG. 2 below).

According to various embodiments, the input image data may include a plurality of images, wherein each image of the plurality of images has an exposure time, wherein the exposure time varies amongst the images of the plurality of images.

According to various embodiments, the interpolation may include or may be a cubic interpolation.

According to various embodiments, the interpolation may include or may be minimizing a cost function (for example like shown in Equation 10 below).

According to various embodiments, the interpolation may include or may be an interpolation of an HDR image obtained based on the input image data to restore underexposed and saturated pixels of the HDR image.

Figure 1C:
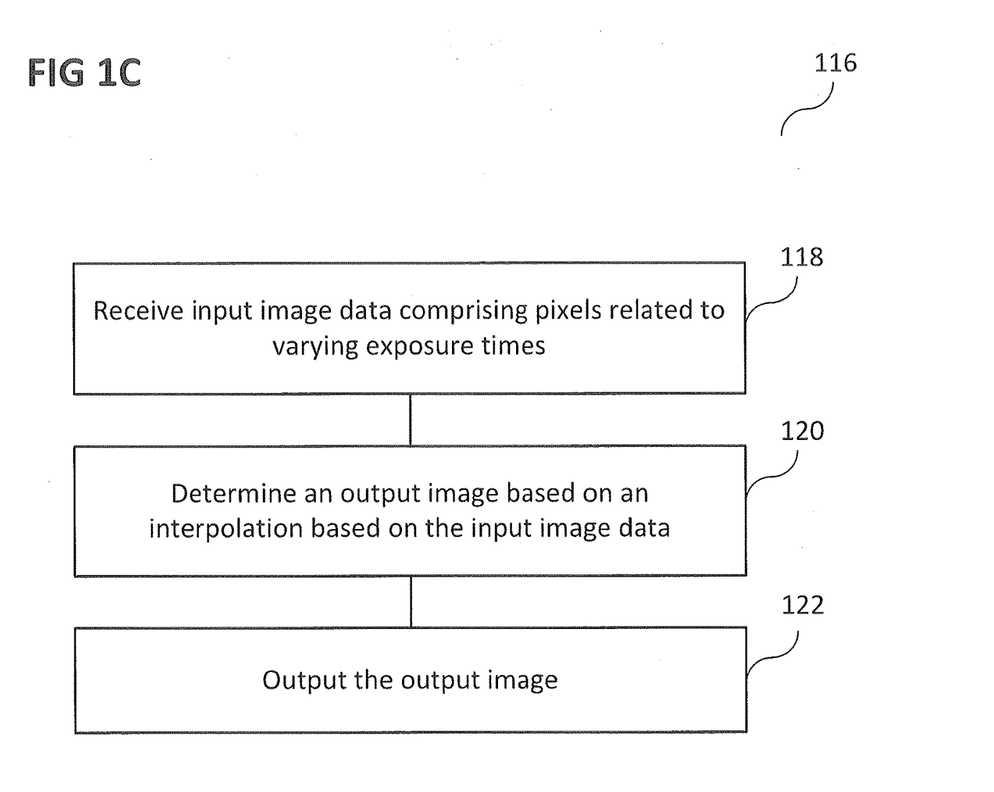
FIG. 1C shows a flow diagram illustrating an image processing method according to various embodiments.

FIG. 1C shows a flow diagram 116 illustrating an image processing method according to various embodiments. In 118, input image data including pixels related to varying exposure times may be received. In 120, an output image may be determined based on an interpolation based on the input image data. In 122, the output image may be outputted.

According to various embodiments, the interpolation may include or may be a spatial and temporal interpolation of the input image data.

According to various embodiments, the image processing method may further include: determining a weighting factor, and determining the output image further based on the weighting factor.

According to various embodiments, the image processing method may further include determining the weighting factor based on an intermediate pixel.

According to various embodiments, the intermediate pixel may be based on an intensity mapping function.

According to various embodiments, the weighting factor may be close to one if the intensity mapping function is reliable.

According to various embodiments, the weighting factor may be close to zero if the intensity mapping function is not reliable.

According to various embodiments, the input image data may include or may be an input image including rows, wherein the exposure time varies amongst the rows.

According to various embodiments, the input image data may include or may be a plurality of images, wherein each image of the plurality of images has an exposure time, wherein the exposure time varies amongst the images of the plurality of images.

According to various embodiments, the interpolation may include or may be a cubic interpolation.

According to various embodiments, the interpolation may include or may be minimizing a cost function.

According to various embodiments, the interpolation may include or may be an interpolation of an HDR image obtained based on the input image data to restore underexposed and saturated pixels of the HDR image.

In the following, a coded reset architecture for capturing of differently exposed images-according to various embodiments will be described.

Differently exposed images may be captured by using the global shutter. This method performs well for a static HDR scene while it suffers from ghosting artifacts due to moving objects and motion blurring artifacts due to camera movement. A row-wise readout architecture called coded rolling shutter may be provided for complementary metal-oxide semiconductor (CMOS) image sensors and the architecture may be used to alleviate these problems for practical HDR imaging. In the following, the row-wise reset architecture to capture differently exposed images while the readout architecture is kept as the conventional one will be described.

Let $t_r(p)$, $t_s(p)$ and $t_e(p)$ be the readout time, the reset time, and the exposure time of the pth row in the captured image. Suppose that the readout time of each row is $\Delta t_r$. The value of $t_r(p)$ is given as $$t_r(p) = t_0 + p\Delta t_r \quad (1)$$

where $t_0$ is the starting readout time of the first row in the captured image.

It will be understood that the readout architecture may be the same as the existing readout architecture while the reset architecture is changed as follows:

$$t_s(p) = t_r - t_e(p) \quad (2)$$

where the value of $t_e(p)$ needs to be determined according to the number of different exposures. For example, consider the case that there are three different exposures. Let $\tau_s$, $\tau_m$ and $\tau_l$ be the short exposure time, the medium exposure time and the long exposure time, respectively. The values of $t_e(p)$ are, with k being any integer number, defined as $$t_e(p) = \begin{cases} \tau_s; & \text{if } p = 3k+1 \\ \tau_m; & \text{if } p = 3k+2 \\ \tau_l; & \text{otherwise} \end{cases} \quad (3)$$

Figure 2:
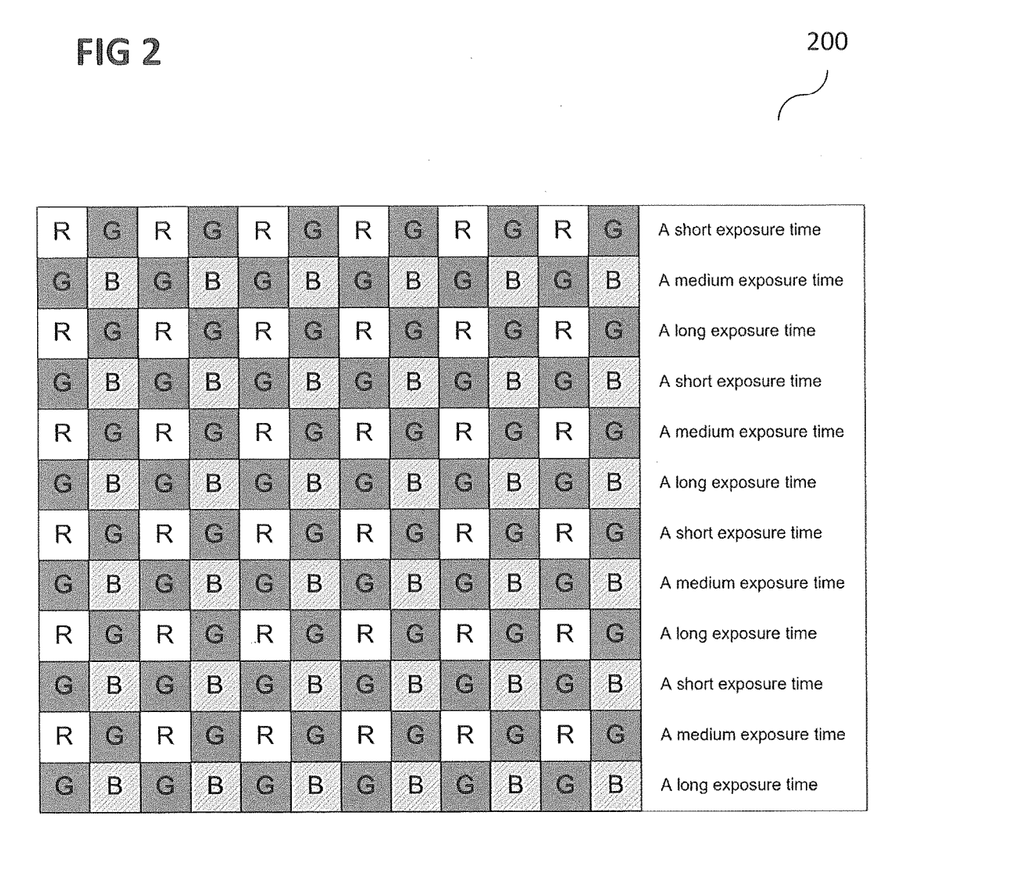
FIG. 2 shows an illustration of an image with three row-wise different exposures.
Figure 3A:
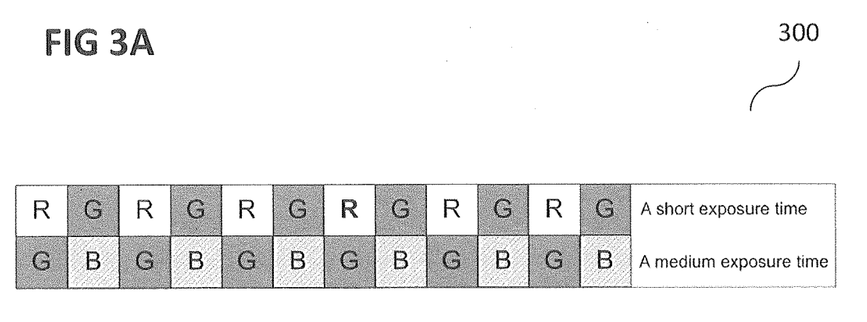
FIG. 3A, FIG. 3B, and FIG. 3C show illustrations of three basic Bayes color filter arrays with different exposures.
Figure 3B:
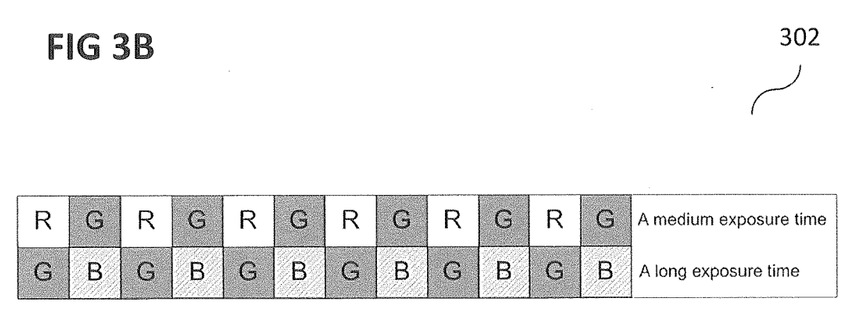
Figure 3C:
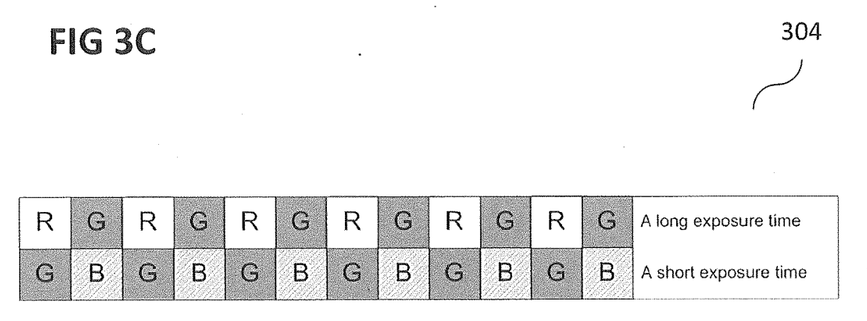

An example is shown in FIG. 2 that such a combination of row-wise exposure times are determined by using three basic patterns in FIG. 3A, FIG. 3B, and FIG. 3C. It is to be noted that there are many different combinations of three different exposures, and three additional basic patterns in FIG. 4 may be desired to construct other combination.

In FIG. 2, FIG. 3A, FIG. 3B, FIG. 3C, FIG. 4A, FIG. 4B, and FIG. 4C, "R" indicates a pixel configured to sense red light, "G" a pixel configured to sense green light, and "B" a pixel configured to sense blue light.

FIG. 2 shows an illustration 200 of an image with three row-wise different exposures, in which for example the rows have a sequence of short exposure time, followed by medium exposure time, followed by long exposure time, again followed by short exposure time.

FIG. 3A, FIG. 3B, and FIG. 3C show illustrations of three basic Bayes color filter arrays with different exposures. FIG. 3A shows an illustration 300 of a first pattern (which may also be referred to as Pattern 1, for example short exposure time followed by medium exposure time). FIG. 3B shows an illustration 302 of a second pattern (which may also be referred to as Pattern 2, for example medium exposure time followed by long exposure time). FIG. 3C shows an illustration 304 of a third pattern (which may also be referred to as Pattern 3, for example long exposure time followed by short exposure time).

Figure 4A:
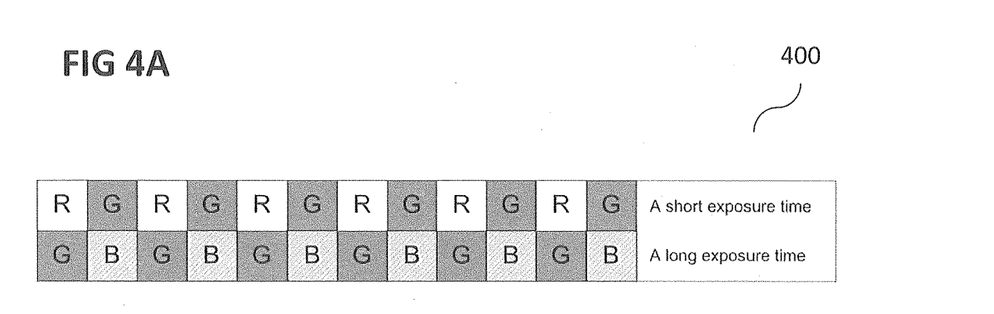
FIG. 4A, FIG. 4B, and FIG. 4C show illustrations of three additional basic Bayes color filter arrays with different exposures.
Figure 4B:
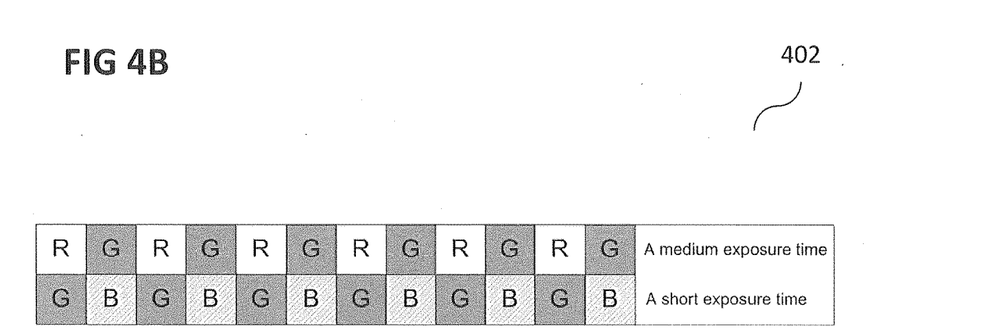
Figure 4C:
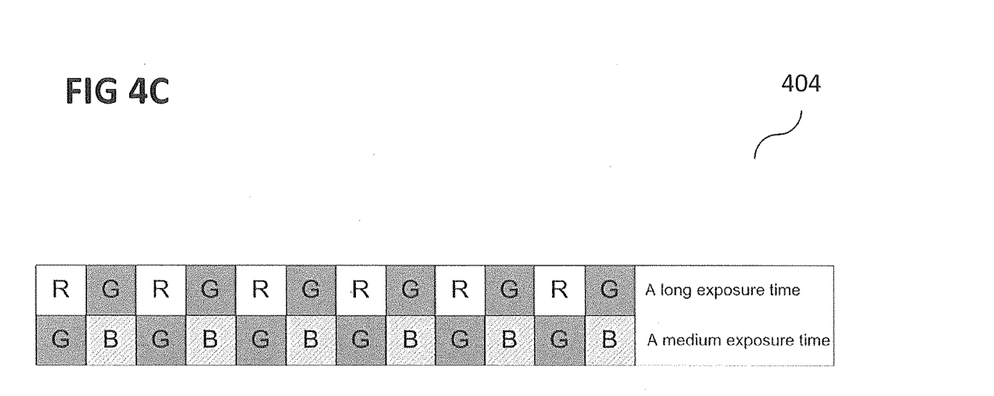

FIG. 4A, FIG. 4B, and FIG. 4C show illustrations of three additional basic Bayes color filter arrays with different exposures. FIG. 4A shows an illustration 400 of a fourth pattern (which may also be referred to as Pattern 4, for example short exposure time followed by long exposure time). FIG. 4B shows an illustration 402 of a fifth pattern (which may also be referred to as Pattern 5, for example medium exposure time followed by short exposure time). FIG. 4C shows an illustration 404 of a sixth pattern (which may also be referred to as Pattern 6, for example long exposure time followed by medium exposure time).

According to various embodiments, three images with differently exposures may be captured by the rolling shutter simultaneously. Neither camera movements nor moving objects among differently exposed images may be an issue for the three differently exposed images. However, the resolution of the captured images may be reduced to one third of the original image size. It may be desired to provide an interpolation method for upsampling of the captured images.

In the following, the cubic interpolation method will be described.

The cubic interpolator may be a spline where each piece is a third-degree polynomial specified in Hermite form, i.e., defined by its values and first derivatives at the end points of the corresponding domain interval. It may be used for interpolation of numeric data specified at given argument values, to obtain a smooth continuous function.

The cubic interpolation method may be used in computer graphics and geometric modeling to obtain curves or motion trajectories that pass through specified points of the plane or three-dimensional space. It may also be used to increase the resolution of differently exposed images.

Let $Z_i(p)$ be an input image and its upsampled image is denoted as $\tilde{Z}_{U,i}(p)$. Given two values $Z_i(p_k)$ and $Z_i(p_{k+1})$, $\tilde{Z}_{U,i}(P)$ is interpolated in the interval $[p_k, p_{k+1}]$ as follows:

$$\tilde{Z}_{U,i}(p) = h_{0,0}(t)Z_i(p_k) + h_{1,0}(t)(p_{k+1}-p_k)\phi_i(p_k) + h_{0,1}(t)Z_i(p_{k+1}) + h_{1,1}(t)(p_{k+1}-p_k)\phi_i(p_{k+1}) \quad (4)$$

where the values of t, $h_{0,0}(t)$, $h_{1,0}(t)$, $h_{0,1}(t)$, $h_{1,1}(t)$, $\phi_i(p_k)$ and $\phi_i(p_{k+1})$ are given as $$t = \frac{p - p_k}{p_{k+1} - p_k},$$

$$h_{0,0}(t) = (1+2t)(1-t)^2,$$

$$h_{1,0}(t) = t(1-t)^2,$$

$$h_{0,1}(t) = t^2(3-2t),$$

$$h_{1,1}(t) = t^2(t-1),$$

$$\phi_i(p_k) = \frac{Z_i(p_{k+1}) - Z_i(p_k)}{2(p_{k+1} - p_k)} + \frac{Z_i(p_k) - Z_i(p_{k-1})}{2(p_k - p_{k-1})},$$

$$\phi_i(p_{k+1}) = \frac{Z_i(p_{k+2}) - Z_i(p_{k+1})}{2(p_{k+2} - p_{k+1})} + \frac{Z_i(p_{k+1}) - Z_i(p_k)}{2(p_{k+1} - p_k)}.$$

Consider the case that $p_{k+1} = 3k+3$, we have $$\tilde{Z}_{U,i}(3k+1) = \frac{20}{27}Z_i(3k) + \frac{4}{9}\phi_i(3k) - \frac{2}{9}\phi_i(3k+3) + \frac{7}{27}Z_i(3k+3), \quad (5)$$

$$\tilde{Z}_{U,i}(3k+2) = \frac{7}{27}Z_i(3k) + \frac{2}{9}\phi_i(3k) - \frac{4}{9}\phi_i(3k+3) + \frac{20}{27}Z_i(3k+3). \quad (6)$$

In the existing cubic interpolation method, the values of $\phi_i(3k)$ and $\phi_i(3k+3)$ are $$\phi_i^*(3k) = \frac{Z_i(3k-3) - Z_i(3k+3)}{6}, \quad (7)$$

$$\phi_i^*(3k+3) = \frac{Z_i(3k+6) - Z_i(3k)}{6}. \quad (8)$$

In the following, the cubic interpolation method according to various embodiments will be described.

Let $Z_i$ ($1 \le i \le 3$) be a set of differently exposed images. The exposure time of $Z_i$ is $\Delta t_i$. Let $p(=(p_x,p_y))$ be a pixel. The middle image $Z_2$ is taken as an example to illustrate the method and devices according to various embodiments. Since the image is interpolated along the x-axis, $p_y$ may be omitted in the description for sake of readability of the description.

For simplicity, it may be assumed that the value of $\Delta t_2$ is larger than that of $\Delta t_1$ but smaller than that of $\Delta t_3$. Due to the different exposures of the images $Z_i$ ($1 \le i \le 3$), there may be possible large intensity changes between them. The intensity mapping functions (IMFs) among differently exposed images may be used to produce intermediate pixels. Let $\Lambda_{1,2}(z)$ and $\Lambda_{3,2}(z)$ be the IMFs from the image $Z_1$ to the image $Z_2$ and from the image $Z_3$ to the image $Z_2$, respectively. The IMF $\Lambda_{1,2}(z)$ is computed by using the histograms of images $Z_1$ and $Z_2$. Similarly, the IMF $\Lambda_{3,2}(z)$ can be computed. The intermediate pixel $\tilde{Z}_{1,2}(p)$ may be constructed as $$\tilde{Z}_{I,2}(p) = \begin{cases} \Lambda_{1,2}(Z_1(k)); & \text{if } p_x = 3k+1 \\ \Lambda_{3,2}(Z_3(k)); & \text{if } p_x = 3k+2 \end{cases} \quad (9)$$

The intermediate pixels may serve as guided pixels for the cubic interpolation. This implies that the temporal correlation among all the input images is taken into consideration according to various embodiments. In addition, the spatial correlation in the image is also considered as in the existing cubic interpolation algorithm.

A weighting factor w(p) is assigned to the intermediate pixel $\tilde{Z}_{1,2}(p)$ according to the reliability of the IMFs. Its value may be (or may approach) 1 if the IMF is reliable, and may be (or may approach) 0 otherwise.

Instead of computing the values of $\phi_i(3k)$ and $\phi_i(3k+3)$ as in Equations (7) and (8), their values may according to various embodiments be obtained by minimizing the following cost function:

$$\Psi(\phi_i(3k), \phi_i(3k+3)) = \lambda \sum_{p=3k+1}^{3k+2} (\phi_i(3p) - \phi_i^*(3p))^2 + \\ (1-\lambda)\sum_{p=3k+1}^{3k+2} w(p)(\tilde{Z}_{U,2}(p) - \hat{Z}_{I,2}(p))^2, \quad (10)$$

where the values of $\tilde{Z}_{U,2}(3k+1)$ and $\tilde{Z}_{U,2}(3k+2)$ may be determined by using the method in Equations (5) and (6) and the values of $\phi_i^*(3k)$ and $\phi_i^*(3k+3)$ may be given in Equations (7) and (8).

It will be understood that both the spatial correlation and the temporal correlation are utilized in the cubic interpolation method according to various embodiments, while only the spatial correlation is used in the commonly used cubic interpolation method.

Defining one matrix A and three vectors b, c, and d as $$A = \begin{bmatrix} \frac{4w(3k+1)}{9} & \frac{-2w(3k+1)}{9} \\ \frac{2w(3k+2)}{9} & \frac{-4w(3k+2)}{9} \end{bmatrix},$$

$$b = \begin{bmatrix} w(3k+1)\left(\hat{Z}_{I,2}(3k+1) - \frac{20}{27}Z_2(3k) - \frac{7}{27}Z_2(3k+3)\right) \\ w(3k+2)\left(\hat{Z}_{I,2}(3k+2) - \frac{7}{27}Z_2(3k) - \frac{20}{27}Z_2(3k+3)\right) \end{bmatrix},$$

$$c = \begin{bmatrix} \phi_i^*(3k) \\ \phi_i^*(3k+3) \end{bmatrix},$$

$$d = \begin{bmatrix} \phi_i(3k) \\ \phi_i(3k+3) \end{bmatrix},$$

the values of $\phi_i(3k)$ and $\phi_i(3k+3)$ may be computed as $$d = ((1-\lambda)A^T A + \lambda I)^{-1}((1-\lambda)b + \lambda c), \quad (11)$$

where I is a 2×2 identity matrix. $\lambda$ is a constant and its value is less than ⅛. It will be understood that the temporal correlation may dominate the interpolation if it is reliable. Otherwise, the spatial correlation may dominate the interpolation.

According to various embodiments, a cross image cubic interpolation for differently exposed images may be provided. Besides the spatial correlation in the interpolated image, the temporal correlation among the differently exposed images may also be utilized to determine two coefficients of the cubic interpolation. The temporal correlation may dominate the interpolation if it is reliable. Otherwise, the spatial correlation may dominate the interpolation.

The PSNR value of upsampled image may be improved by up to 22.76 dB. It is to be noted that the devices and methods according to various embodiments may be utilized to improve the performance of other interpolation methods for a set of differently exposed images.

Besides interpolating pixels as above, according to various embodiments an alternative way is to first generate an HDR image using all the differently exposed images. A cubic interpolation method is designed to restore all those under-exposed and saturated pixels and smooth the HDR image. The details are given as below.

Here, a new cubic interpolation method is introduced in HDR domain. The objective is to ensure that the resolution of the composed HDR image is close to the actual resolution. In other words, all saturated pixels as well as under-exposed pixels are restored using neighboring information.

Two sets of points are defined in image space, namely, on-grid points that correspond to the pixel locations and off-grid points that lie in between the pixel locations. The method according to various embodiments may have two steps. First, all off-grid points are estimated from the on-grid points. Then, all off-grid points are used to interpolate the on-grid ones. As an example, the cubic interpolation which is close to the ideal sinc interpolation is adopted. Let $M_0(i+0.5,j+0.5)$ be the set of off-grid brightness values located at the centers of all sets of four pixels. If the $M_0$ values were known, the desired on-grid brightnesses $M_r(i,j)$ can be determined by the cubic interpolation as:

$$\sum_{m=0}^{3}\sum_{n=0}^{3} f(1.5-m, 1.5-n)M_0(i+m-1.5, j+n-1.5), \quad (12)$$

where f is the cubic convolution kernel. If a specific off-grid point is focused on, then the above equation can be written in the following vector form:

$$M_r = FM_0. \quad (13)$$

where the vector $M_r$ includes 16×1 on-grid brightness values, the matrix F includes 16×49 cubic convolution kernel elements, and the vector $M_0$ includes 49×1 off-grid brightness values. Unfortunately, the off-grid brightness $M_0$ is not available, its value needs to be estimated.

All pixels are classified into two groups:

$$\Omega_1 = (p | \text{pixel } p \text{ is well exposed}), \quad (14)$$

$$\Omega_2 z = p | \text{pixel } p \text{ is saturated or under exposed}). \quad (15)$$

Using the cubic interpolation method, it can be derived that $$\begin{bmatrix} M_1 \\ M_2 \end{bmatrix} = \begin{bmatrix} F_1 \\ F_2 \end{bmatrix} M_0, \quad (16)$$

where $M_1$ and $M_2$ correspond to all pixel in the sets $\Omega_1$ and $\Omega_2$, respectively.

Instead of discarding all pixels in the set $\Omega_2$, a new $l_2$ norm based optimization problem is formulated as follows:

$$\min_{M_0} \{E(M_0)\}, \quad (17)$$

where $E(M_0)$ is defined as $$E(M_0) = E_1(M_0) + \beta E_2(M_0), \quad (18)$$

$\beta (\geq 0)$ is a constant. The terms $E_1(M_0)$ and $E_2(M_0)$ are given as $$E_1(M_0) = \frac{1}{2} \|M_0\|_2^2 + \lambda^T (F_1 M_0 - M_1), \quad (19)$$

$$E_2(M_0) = \frac{1}{2} (F_2 M_0 - M_2)^T W (F_2 M_0 - M_2). \quad (20)$$

Here, W is the measurement of the reliability of $M_2$. The value of W is determined by the exposedness level of the corresponding pixel in the differently exposed images.
The optimal solution to the $l_2$ norm based optimization problem (6) is given by $$M_0^* = (I + \beta F_2^T W F_2)^{-1} (\beta F_2^T W M_2 - F_1^T \lambda^*), \quad (21)$$

the value of $\lambda^*$ is computed as $$\lambda^* = (F_1 (I + \beta F_2^T W F_2)^{-1} F_1^T)^{-1} \cdot (\beta F_1 (I + \beta F_2^T W F_2)^{-1} F_2 W M_2 - M_1). \quad (22)$$

It can be verified that $$F_1 M_0^* = M_1. \quad (23)$$

However, the following equation $$F_2 M_0^* = M_2 \quad (24)$$

is usually not true. Clearly, a stricter constraint is imposed to the pixels in the set $\Omega_1$ than the pixels in the set $\Omega_2$. As such, the pixels in the set $\Omega_1$ play a more important role in the proposed method than the pixels in the set $\Omega_2$. This is because that the pixels in the set $\Omega_2$ are not as reliable as the pixels in the set $\Omega_1$. Since all the pixels in the set $\Omega_2$ are taken into consideration in the proposed method rather than being discarded as in the existing interpolation method, the quality of the interpolated HDR image is expected to be improved by the proposed new method.

If the value of $\beta$ is 0, the proposed optimization problem will be the same as the existing optimization problem. The optimal solution is given by $$M_0^* = F_1^T (F_1 F_1^T)^{-1} M_1. \quad (25)$$

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An image processing device comprising:
    an input circuit configured to receive input image data comprising pixels related to varying exposure times, the input image data comprising a plurality of input images;
    an interpolation circuit configured to determine an output image based on an interpolation based on the input image data;
    an output circuit configured to output the output image; and
    wherein the interpolation circuit is configured to perform the interpolation with respect to at least one of the plurality of input images to produce a corresponding upsampled input image, the interpolation comprising a spatial interpolation based on the pixels of said one input image and a temporal interpolation based on the pixels of said one input image and the pixels of at least another one of the plurality of input images.

2. The image processing device of claim 1, further comprising:
    a weighting factor determination circuit configured to determine a weighting factor wherein the interpolation circuit is further configured to determine the output image further based on the weighting factor.

3. The image processing device of claim 2, wherein the weighting factor determination circuit is configured to determine the weighting factor based on an intermediate pixel.

4. The image processing device of claim 3, wherein the intermediate pixel is based on an intensity mapping function.

5. The image processing device of claim 4, wherein the weighting factor is determined based on a reliability of the intensity mapping function the weighting factor having a value ranging from zero to one.

6. The image processing device of claim 1, wherein each of the plurality of input images comprises rows, wherein the exposure time varies amongst the rows.

7. The image processing device of claim 1, wherein each of the plurality of input images has an exposure time, wherein the exposure time varies amongst the plurality of input images.

8. The image processing device of claim 1, wherein the interpolation comprises a cubic interpolation.

9. The image processing device of claim 1, wherein the interpolation comprises minimizing a cost function.

10. The image processing device of claim 1, wherein the interpolation comprises an interpolation of an high dynamic range image obtained based on the input image data to restore under-exposed and saturated pixels of the high dynamic range image without discarding any pixels in the high dynamic range image.

11. An image processing method comprising:
  receiving input image data comprising pixels related to varying exposure times, the input image data comprising a plurality of input images;
  determining an output image based on an interpolation based on the input image data;
  outputting the output image; and
  wherein the interpolation circuit is configured to perform the interpolation with respect to at least one of the plurality of input images to produce a corresponding upsampled input image, the interpolation comprising a spatial interpolation based on the pixels of said one input image and a temporal interpolation based on the pixels of said one input image and the pixels of at least another one of the plurality of input images.

12. The image processing method of claim 11, further comprising:
  determining a weighting factor; and
  determining the output image further based on the weighting factor.

13. The image processing method of claim 12, further comprising:
  determining the weighting factor based on an intermediate pixel.

14. The image processing method of claim 13, wherein the intermediate pixel is based on an intensity mapping function.

15. The image processing method of claim 14, wherein the weighting factor is determined based on a reliability of the intensity mapping function the weighting factor having a value ranging from zero to one.

16. The image processing method of claim 11, wherein each of the plurality of input images comprises rows, wherein the exposure time varies amongst the rows.

17. The image processing method of claim 11, wherein each of the plurality of input images has an exposure time, wherein the exposure time varies amongst the plurality of input images.

18. The image processing method of claim 11, wherein the interpolation comprises a cubic interpolation without discarding any pixels in an high dynamic range image.

19. The image processing method of claim 11, wherein the interpolation comprises minimizing a cost function with different constraints to different pixels according to their reliabilities.

20. The image processing method of claim 11, wherein the interpolation comprises an interpolation of an high dynamic range image obtained based on the input image data to restore under-exposed and saturated pixels of the high dynamic range image.

* * * * *